United States Patent [19]

Eagan et al.

[11] Patent Number: 5,521,824
[45] Date of Patent: May 28, 1996

[54] METHOD AND APPARATUS FOR CONTROLLING AN ENGINE TEST APPARATUS USING LEAD-LAG CONTROL

[75] Inventors: Thomas E. Eagan, Eureka; William R. Larson; Durwin D. Nigus, both of Chillicothe, all of Ill.

[73] Assignee: Caterpillar Inc., Peoria, Ill.

[21] Appl. No.: 335,417

[22] Filed: Nov. 3, 1994

Related U.S. Application Data

[63] Continuation-in-part of Ser. No. 986,309, Dec. 7, 1992, Pat. No. 5,435,192.

[51] Int. Cl.⁶ .................................................. G01M 15/00
[52] U.S. Cl. ............... 364/431.03; 364/511; 364/551.01; 73/116; 73/117.3
[58] Field of Search ................ 364/431.03, 431.04, 364/431.05, 424.03, 511, 551.01, 551.02, 571.01; 73/116, 117.2, 117.3, 862, 862.08, 862.18; 324/378, 383; 123/146.5

[56] References Cited

U.S. PATENT DOCUMENTS

| | | | |
|---|---|---|---|
| 4,169,372 | 10/1979 | Colwill et al. | 73/862.18 |
| 4,870,585 | 9/1989 | Manzolini | 364/431.03 |
| 5,078,008 | 1/1992 | Yagi et al. | 73/117 |
| 5,119,304 | 2/1992 | Seki | 364/431.05 |
| 5,195,038 | 3/1993 | Yagi et al. | 364/431.05 |
| 5,385,042 | 1/1995 | La Belle | 73/117 |

Primary Examiner—Kevin J. Teska
Assistant Examiner—Tan Nguyen
Attorney, Agent, or Firm—James R. Yee

[57] ABSTRACT

A system (102) and method for controlling the operation of an engine test apparatus (104) during a test cycle is provided. The system (102) includes an operator interface (106) for producing a control mode signal and a plurality of setpoints. The system (102) also includes a test controller (108) for receiving the control mode signal and the plurality of setpoints and responsively operating the engine test apparatus. The test controller (108) senses operating characteristics of the engine test apparatus (104). The test controller (108) also selectively operates engine test apparatus parameters in accordance with the control mode signal.

6 Claims, 10 Drawing Sheets

METHOD AND APPARATUS FOR CONTROLLING AN ENGINE TEST APPARATUS USING LEAD-LAG CONTROL

This is a continuation-in-part of U.S. application Ser. No. 07/986,309 filed Dec. 7, 1992 now U.S. Pat. No. 5,435,192, issued Jul. 25, 1995.

TECHNICAL FIELD

This invention relates generally to an apparatus and method for controlling an engine test apparatus and more particularly, to an apparatus and method for controlling a test apparatus using lead-lag control.

BACKGROUND ART

General purpose controllers are increasingly being used in testing applications. Controllers may be analog devices, but due to the increasingly complex and precise control algorithms required, digital controllers (for example microprocessor-based) are being used.

In the field of testing applications for engines, for example, testing systems are used for controlling an operating characteristic of the engine and an operating characteristic of a dynamometer connected to the engine. Operating characteristics of both the engine and the dynamometer may be controlled. In some situations, a transmission with a plurality of gear ratios is coupled to and between the engine and dynamometer. Operating characteristics that may be controlled include engine speed, engine torque, throttle position, dynamometer torque, dynamometer speed, and dynamometer current. Typically, one engine characteristic and one dynamometer characteristic are being simultaneously controlled.

If there is not a transmission, a coupling mechanism provides a direct connection between the engine and the dynamometer. The engine and transmission speed are substantially equal. The engine output speed and the dynamometer input speed are also substantially the same. Obviously, engine speed and dynamometer speed can not be controlled simultaneously and neither can engine torque and dynamometer torque. Therefore the list of operating conditions that may be controlled include engine speed, engine torque, throttle position, and dynamometer current.

Most systems include analog controllers. That is, the engine's throttle and the dynamometer are controlled by analog components. Such systems are sold under the registered trademark Cellmate by Digalog of Ventura CA. Analog controllers do not allow for instantaneous changes from one mode to another mode, for example, engine speed to engine torque. The Cellmate system for example must be brought down to 0% throttle (IDLE) and all the load must be taken off of the dynamometer before a mode change occurs.

It is therefore desirous to provide a test controller that allows for instantaneous mode changes.

A test is usually a series or cycle of steps. For example, a series of steps might include:

(1) HOLD IN LOW IDLE FOR 5 MINUTES,
(2) RAMP UP TO AN ENGINE SPEED OF 2100 RPM WITH NO LOAD ON THE DYNAMOMETER, AND
(3) STEP DOWN TO LOW IDLE.

The system must be programmed to accomplish this cycle. An operator typically has to write a "program" or a series of steps in order to set up a cycle. The system usually includes a display and a keyboard for inputting data.

A problem with this type of arrangement is that an operator must be familiar with the "language" that is used to program the system. The operator must be extensively trained in order to operate or program the system.

Another problem associated with past systems relates to the inherent dynamic aspects of an engine's response. Typically, these systems control the engine using a feedback control scheme. Furthermore, the control scheme may include proportion-plus intehral-plus derivative control. However, it has been discovered that the response of some engines include a dynamic aspect which make the engine's response harder to predict utilizing the typical control strategies.

The present invention is adapted to overcome one or more of the problems as set forth above.

DISCLOSURE OF THE INVENTION

In one aspect of the present invention a system for controlling the operation of an engine test apparatus during a test cycle is provided. The engine test apparatus includes an engine and a throttle actuator for responsively controlling fuel flow to the engine. The system is adapted to controllably actuate the throttle actuator using a desired one of position, torque and engine speed feedback modes. The system is produces a control mode signal indicative of the desired feedback mode and a respective setpoint. The system also senses an operating characteristic of the engine test apparatus corresponding to the desired feedback mode and responsively produces a respective operating characteristic signal. And the system operates the engine test apparatus by operating the throttle actuator using closed loop control based on the setpoint. Lead-lag compensation is to compensate for dynamic aspects of the engine's response in response to torque or engine speed feedback being desired.

In another aspect of the present invention, a method for controlling the operation of an engine test apparatus during a test cycle is provided. The engine test apparatus includes an engine and a throttle actuator for responsively controlling fuel flow to the engine. The system is adapted to controllably actuate the throttle actuator using a desired one of position, torque, and engine speed feedback modes. The method includes the steps of producing a control mode signal indicative of a desired feedback mode and a respective setpoint, sensing an operating characteristic of the engine test apparatus corresponding to the desired feedback mode and responsively producing a respective operating characteristic signal. The method also includes the steps of operating the throttle actuator using closed loop control based on the setpoint and compensating for dynamic aspects of the engine's response using lead-lag phase compensation in response to torque or engine speed feedback being desired.

BEST MODE FOR CARRYING OUT THE INVENTION

Figure 1:
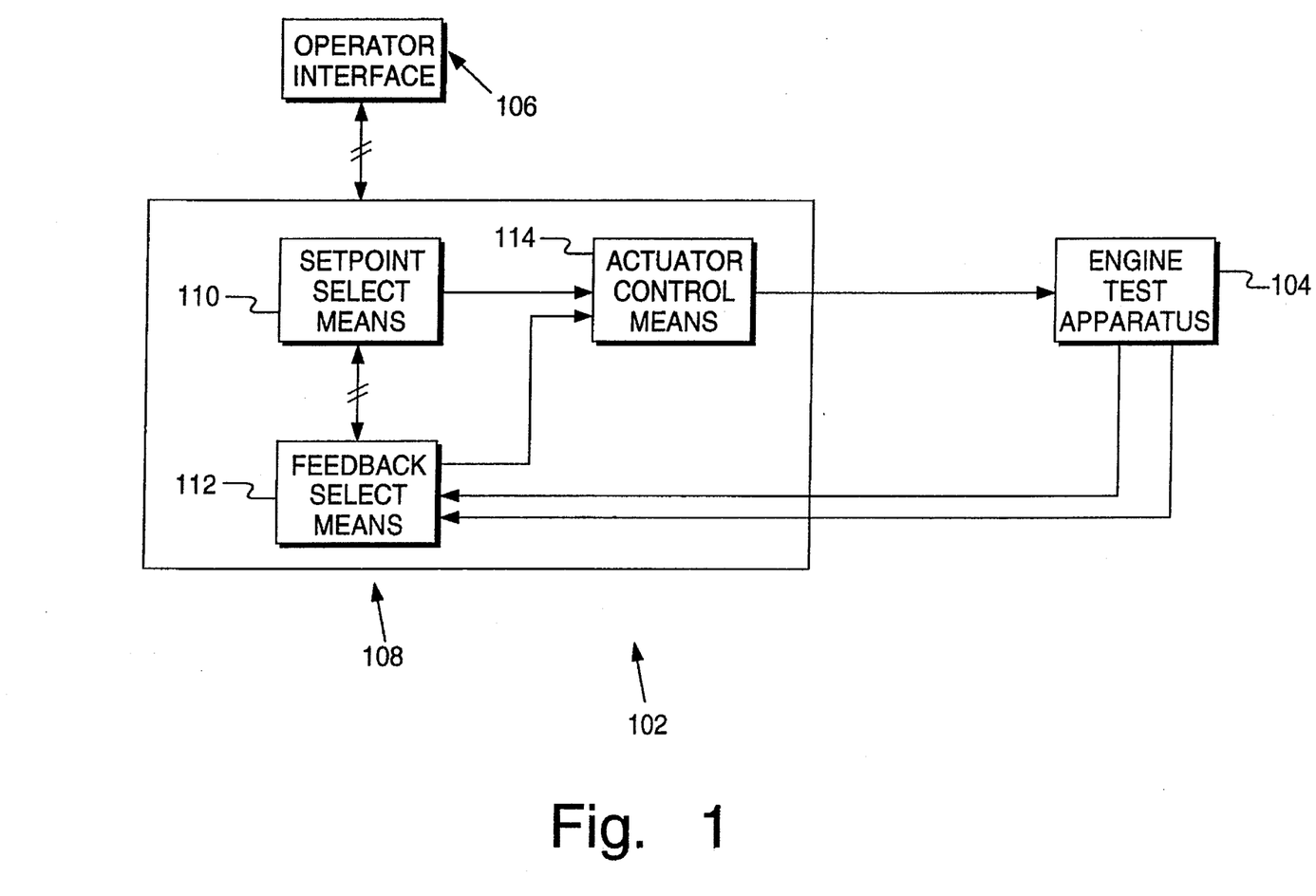
FIG. 1 is a block diagram of a system for operating an engine test apparatus including an operator interface and a test control means.

With reference to FIG. 1, the present invention provides a system 102 for controlling the operation of an engine test apparatus 104 during a test cycle. The system 102 includes an operator interface means 106 for producing a control mode signal and a plurality of setpoints and a test control means 108 for receiving the control mode signal and the plurality of setpoints and responsively operating the engine test apparatus 104.

Figure 2:
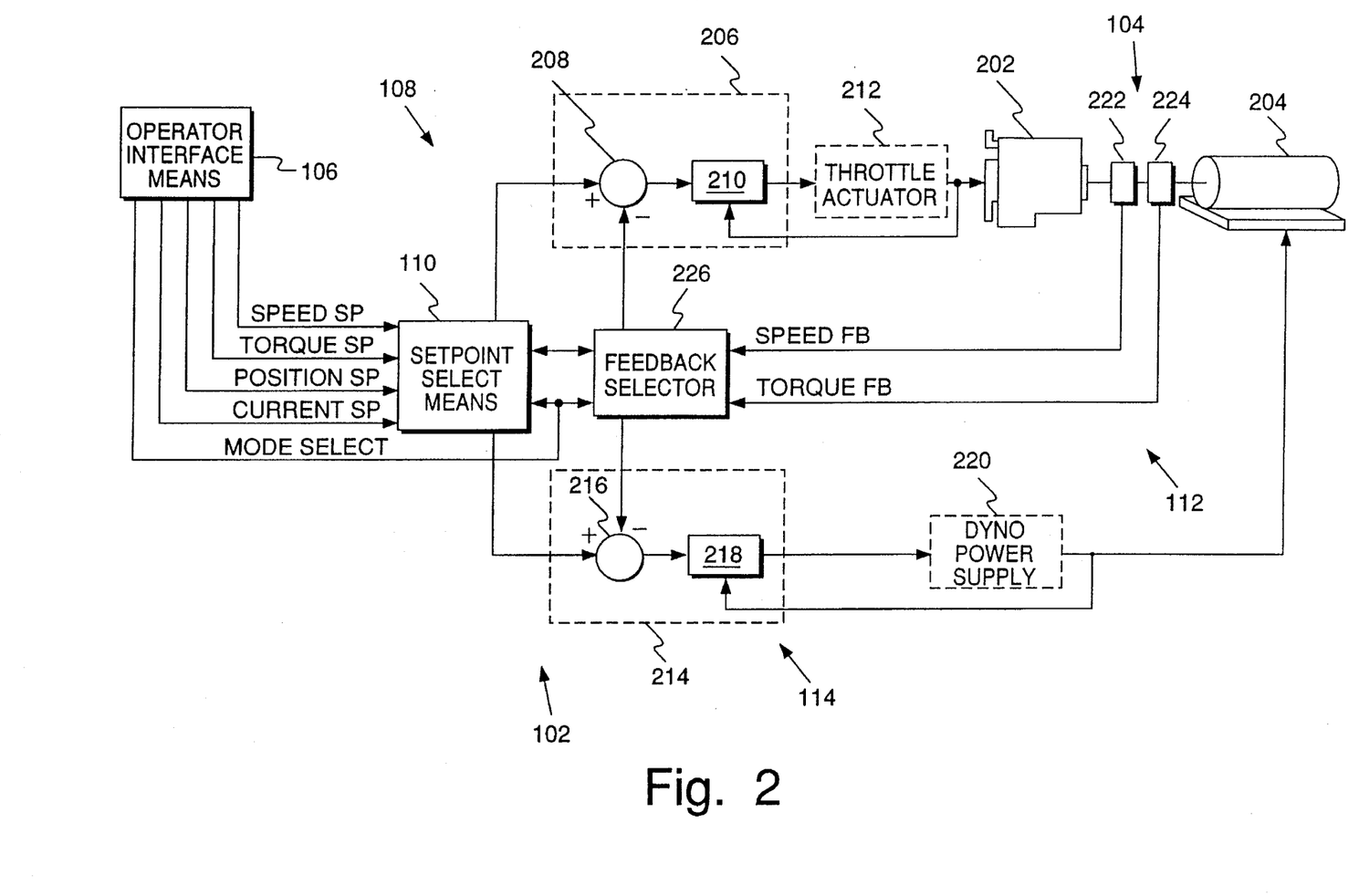
FIG. 2 is a functional block diagram of the system of FIG. 1 including a throttle actuator control means and a dynamometer current actuator control means.

As shown in FIG. 2, in a first embodiment the engine test apparatus 104 includes an engine 202 and a dynamometer 204. The dynamometer 204 is used to apply "loads" on the engine to simulate operating conditions. In a second embodiment, the engine test apparatus 104 further includes a transmission (not shown) coupled between the engine 202 and the dynamometer 204.

Referring back to FIG. 1, the test control means 108 includes a setpoint select means 110, a feedback select means 112, and an actuator control means 114.

The setpoint select means 110 responsively selects one of the setpoints as a function of the received control mode signal.

The feedback select means 112 senses a plurality of operating characteristics of the engine test apparatus 102 and responsively produces a plurality of respective operating characteristic signals. The feedback select means 112 also responsively selects one of the operating characteristic signals as a function of the received control mode signal.

The actuator control means 114 receives the selected one of the setpoints and the selected one of the operating characteristic signals and responsively actuates the engine test apparatus 104.

With reference to FIG. 2, in the first embodiment the feedback select means 112 includes means 222 for sensing the engine output speed and means 224 for sensing the engine output torque. On one embodiment, the engine output torque sensing means 224 includes a strain gauge for measuring torque directly on the shaft between the engine 202 and the dynamometer 204. In another embodiment, the engine output torque sensing means 224 includes a lever arm and load cell arrangement (not shown) for measuring torque at the dynamometer 204. Typically, the strain gauge arrangement is used in "steady-state" test applications and the lever arm/load cell arrangement in "transient" test applications.

In the second embodiment referred to above, the engine test apparatus 102 includes a transmission coupled between the engine 202 and the dynamometer 204. In the second embodiment, the feedback select means 112 includes means for sensing the engine output speed, the engine output torque, the dynamometer input speed, and the dynamometer input torque.

The engine test apparatus 102 further includes a throttle actuator 212 and a dynamometer power supply 220.

The throttle actuator 212 is adapted to control fuel flow to the engine 202 in response to a throttle command. The throttle actuator 212 is dependent upon the type of engine and the governor which provides fuel flow to the engine 202. For example, the governor may be mechanical or electronic.

The actuator control means 114 includes a throttle actuator control means 206 responsive to the selected setpoint and selected feedback for producing the throttle command.

The setpoint select means 110 further includes means for selecting another setpoint as a function of the control mode signal. The feedback select means 112 further includes means for selecting another operating characteristic signal as a function of the control mode signal.

The dynamometer power supply 220 is adapted to controllably provide electric current to the dynamometer 204 in response to a current command. The actuator control means 114 includes a dynamometer actuator control means 214 responsive to the another setpoint and the another operating characteristic signal.

In the preferred embodiment, the throttle actuator control means 206 and the dynamometer actuator control means 214 use negative feedback control loops.

The feedback select means 112 includes a feedback selector 226 for selecting a feedback signal based on the control mode signal and delivers the selected feedback signal to the throttle actuator control means 206. The setpoint select means 110 selects a setpoint signal based on the control mode signal and delivers the selected setpoint to the throttle actuator control means 106. The throttle actuator control means 206 includes a first adder 208. The first adder subtracts the selected feedback signal from the selected setpoint and produces a first error signal. A throttle position control means 210 receives the first error signal and produces a throttle command.

Figure 3A:
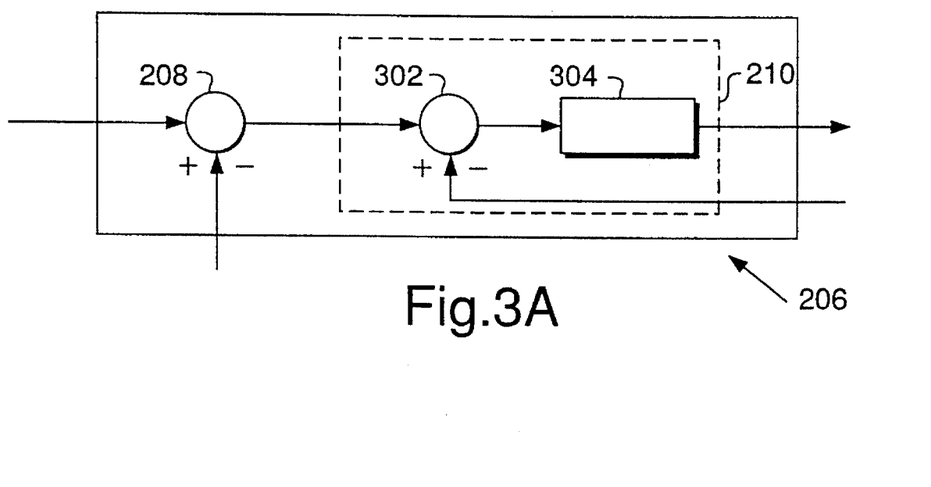
FIG. 3A is a functional block diagram of the throttle actuator control means of FIG. 2, according to an embodiment of the present invention.

In one embodiment, the throttle position control means 210 uses an open loop control. As shown in FIG. 3A, in another embodiment the throttle position control loop is closed on throttle position.

The feedback selector 226 selects another feedback signal based on the control mode signal and delivers the other selected feedback signal to the dynamometer actuator control means 214. The setpoint select means 110 selects another setpoint signal based on the control mode signal and delivers the other selected setpoint to the dynamometer actuator control means 214. The dynamometer actuator control means 214 includes a second adder 216. The second adder 216 subtracts the other selected feedback signal from the other selected setpoint and produces a second error signal. A dynamometer current control means 218 receives the second error signal and produces a current command.

Figure 4:
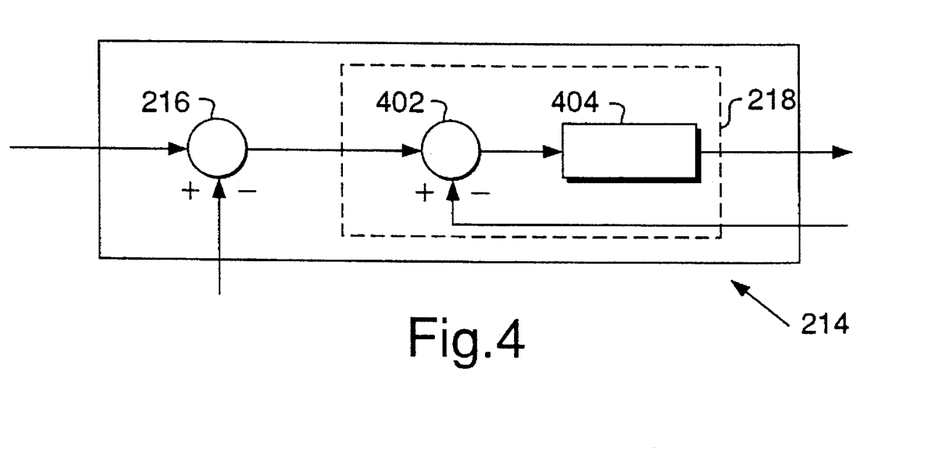
FIG. 4 is a functional block diagram of the dynamometer actuator control means of FIG. 2.

In one embodiment, the dynamometer current control means 214 uses an open loop control. As shown in FIG. 4, in another embodiment the throttle position control loop is closed on dynamometer current.

Figure 5:
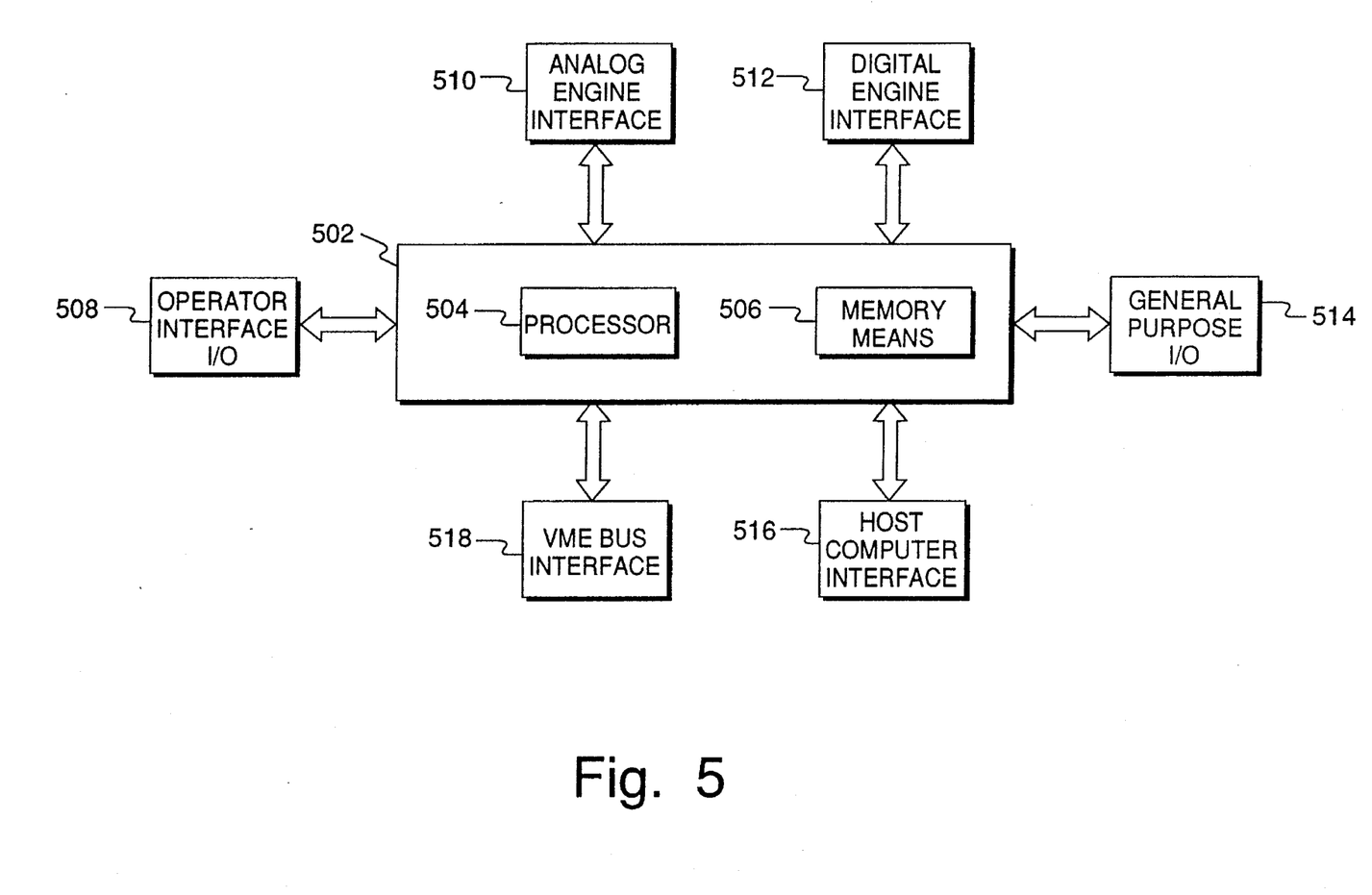
FIG. 5 is a block diagram illustrating the architecture of the test control means of FIG. 1; according to an embodiment of the present invention.

With reference to FIG. 5, the test control means 108 includes a controller 502. The controller 502 is centered on a digital processor 504. In the preferred embodiment, a specialized processor, known as a digital signal processor (DSP) is used. One suitable DSP is available from Texas Instruments of Dallas, Tex. as model no. TMS320C30. In the preferred embodiment, a real-time operating system (OS) provides the working environment for the digital processor 504. One suitable OS is the SPOX-OS Real Time Operating System available from Spectron Microsystems of Santa Barbara, Calif.

The controller 502 also includes a memory means 506. The memory means 506 is used to store software programs, parameters, etc. In the preferred embodiment, the memory means 506 includes four types of memory, listed below along with the main use of each type of memory.

| | |
|---|---|
| EEPROM | Setup parameters |
| | Cycle file storage |
| Sectored Flash Memory | Bootup routine |
| | Executable storage |
| Static RAM (25ns) | Zero-Wait-State run-time access for executable |
| Dynamic RAM | Processor "stack", |
| | Dynamic Allocation Heap, |
| | Temporary File Storage, |
| | Scratch-pad memory. |

The controller 502 communicates with the outside world via a number of interfaces or "I/O" interfaces.

An operator interface I/O 508 provides a data link between the controller 502 and the operator interface means 106.

An analog engine interface 510 relays information such as the setpoints, control commands, and feedback between the engine 202 and the test control means 108. The analog engine interface 510 provides the analog input/output channels used for feedback measurement and control signal outputs. The input are processed through signal conditioning circuits, anti-aliasing filters, and a multiplexed analog to digital (A/D) converter. The outputs are processed through digital to analog (D/A) converters and reconstruction filters. The interface provides direct connection to the engine test apparatus actuators and power amplifiers and a direct connection to the throttle input of the governor.

In the preferred embodiment, the throttle actuator 212 is an electronic governor. A digital engine interface 512 provides a digital communications link to the throttle actuator 212. This link provides access to governor information, for example, throttle position, timing, rack position, and personality module information.

A general purpose I/O 514 provides communications to other engine control, for example, safety shutdown, engine starter, and other switches. The general purpose I/O interface provides solid state relays and sensors for connections to miscellaneous digital input and/or outputs. This could include switches, safety devices, solenoid actuated devices and programmable logic controllers. The link provides the system 102 with the ability to provide basic safety monitoring and shutdown functions. It also gives the operator direct control through the operator interface means 106 of basic "ON" and "OFF" functions such as starting and killing the engine 202.

A host computer interface 516 provides the system 102 with the capability of communicating with a host computer via a RS-232 or an IEEE-488 port.

A Versa Module Europe (VME) bus interface 518 provides access to expansion peripherals, for example, disk drives, networking cards, graphics cards, additional processors, printer ports, analog to digital converters (A/D), digital to analog converters (D/A), a counter/timer, and/or extended memory.

The system 102 provides for digital control of the engine test apparatus' throttle and dynamometer. To accomplish this, the system 102 includes two control loops: one for the engine's throttle and one for the dynamometer 204.

In the first embodiment, engine output speed and dynamometer input speed are substantially equal. Engine output torque and dynamometer input torque are also substantially equal. Therefore, the plurality of setpoints include an engine speed setpoint, a torque setpoint, a throttle position setpoint, and a dynamometer current setpoint.

In the second embodiment, the plurality of setpoints includes an engine speed setpoint, an engine torque setpoint, a dynamometer speed setpoint, a dynamometer torque setpoint, a throttle position setpoint, and a dynamometer current setpoint.

In the preferred embodiment, the system 102 provides for five "modes". In each, a corresponding engine setpoint and dynamometer setpoint are selected. The selected setpoints correspond to specific parameters on the engine and dynamometer, respectively.

The first or "Speed/Torque" or "S/T" mode provides for closed loop control of the throttle actuator 212 using engine output speed feedback. The selected engine setpoint is indicative of a desired engine speed. The S/T mode also provides for closed loop control of the dynamometer power supply 220 using dynamometer input torque feedback. The selected dynamometer setpoint is indicative of a desired torque.

The second or "Torque/Speed" or "T/S" mode provides for closed loop control of the throttle actuator 212 using engine output torque feedback. The selected engine setpoint is indicative of a desired engine output torque. The T/S mode also provides for closed loop control of the dynamometer power supply 220 using dynamometer input speed feedback. The selected dynamometer setpoint is indicative of a input speed.

As noted above, in the first embodiment the engine output speed and the dynamometer input speed are substantially equivalent, as are the engine output torque and dynamometer input torque. In the second embodiment, the speeds and torques will be dependent on the transmission and the transmission's current gear ratio.

The third or "Position/Torque" or "P/T" mode provides for control of the throttle actuator 212 based on throttle position. The selected engine setpoint is indicative of a desired throttle position. Control of the throttle position may be open or closed. The P/T mode also provides for closed loop control of the dynamometer power supply 220 using dynamometer input torque feedback.

The fourth or "Position/Speed" or "P/S" mode provides for control of the throttle actuator 212 based on throttle position. The P/S mode also provides for closed loop control of the dynamometer power supply 220 using dynamometer input speed feedback.

The fifth or "Position/Current" or "P/C" mode provides for control of the throttle actuator 212 based on throttle position. The P/C mode also provides for control of the dynamometer power supply 220 using dynamometer power supply current. Control may be either open or closed loop.

Figure 3B:
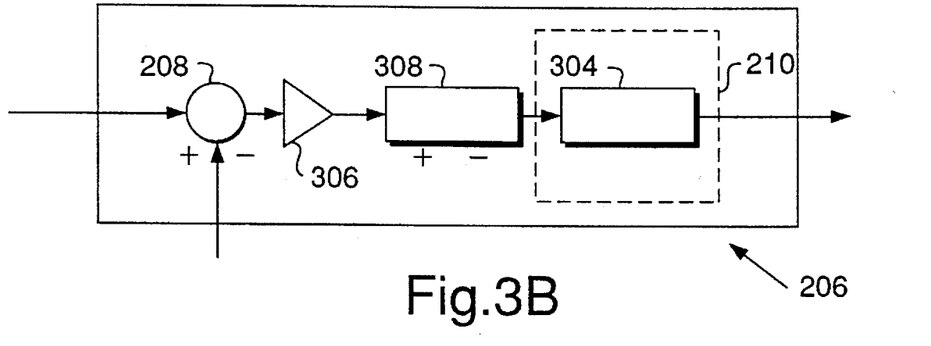
FIG. 3B is a functional block diagram of the throttle actuator control means of FIG. 2, according to another embodiment of the present invention.

It has been discovered that the response of some engines includes a dynamic aspect when controlling the throttle actuator using torque or engine speed feedback. Thus in order to compensate for this dynamic aspect, the present invention includes lead-lag phase compensation. With reference to FIG. 3B, when the system is in the S/T mode or the T/S mode the throttle actuator control means 206 includes a first adder 208. The input to the first adder 208 are the setpoint and the feedback signal corresponding to the desired feedback mode. An amplifier 306 scales the difference between the setpoint and the feedback signal. A lead-lag amplifier 308 compensates for the dynamic aspects of the engine's response. In the preferred embodiment, the lead-lag amplifier 308 implements a 2nd order lead-lag having a transfer function of the general form of:

$$k \cdot (s+a)^2/(s+b)^2$$

where k, a, and b are predetermined constants. Additionally, the throttle position control means 210 is implemented using a proportional-plus integral-plus derivative (PID) control 304.

The system 102 also provides manual and automatic control modes. In the manual mode, the current control mode and setpoints are adjustable by the operator. In the automatic mode, the test control means 108 runs a list of instructions known as a cycle file. Each instruction includes a mode, the appropriate setpoints, and the duration of the instruction. Each setpoint also includes a function type. In the preferred embodiment, the function type may be either a step or a ramp. The function type defines how the test control means 108 will operate either the throttle actuator 212 or the dynamometer power supply 220 to achieve the desired setpoint. For example, if the instruction includes a mode of "S/T" and a throttle command setpoint of 2100 RPM with a ramp function, the test control means will actuate the throttle actuator 212 to linearly increase (or decrease) the engine output speed to achieve the desired setpoint in the given time period.

The cycle files are maintained in the memory means 506 with an associated filename. The operator interface means 106 provides means for accessing, running and editing the cycle files (described below).

The test control means 108 provides for "bumpless" mode changes. During a control mode change, the control loop of one or both of the throttle actuator 212 or the dynamometer power supply will change. If the setpoint of the new mode is not set at a "safe" value, the test control means 108 may operate the engine test apparatus 104 in an unsafe or undesired manner. In order to effect a "bumpless" control mode change, the actuator control means 114 includes means for determining a desired operating value as a function of the one selected of the setpoints and being adapted to actuate the engine test apparatus 104 as a function of said desired operating value and the selected one of said operating characteristic signals. In other words, when a control mode change is requested, the new setpoint is updated to the actual value of the corresponding operating characteristic.

With reference to FIGS. 6–11, the operator interface means 106 is implemented by an integrated touch screen operator display or touchscreen display 600. All operator input is through the touchscreen display 600, and all displays appear on the monitor to which the touchscreen is attached. No keyboard is necessary, because very little "alpha" input is needed. When it is needed, a "touch keyboard" is displayed (see below).

Figure 6:
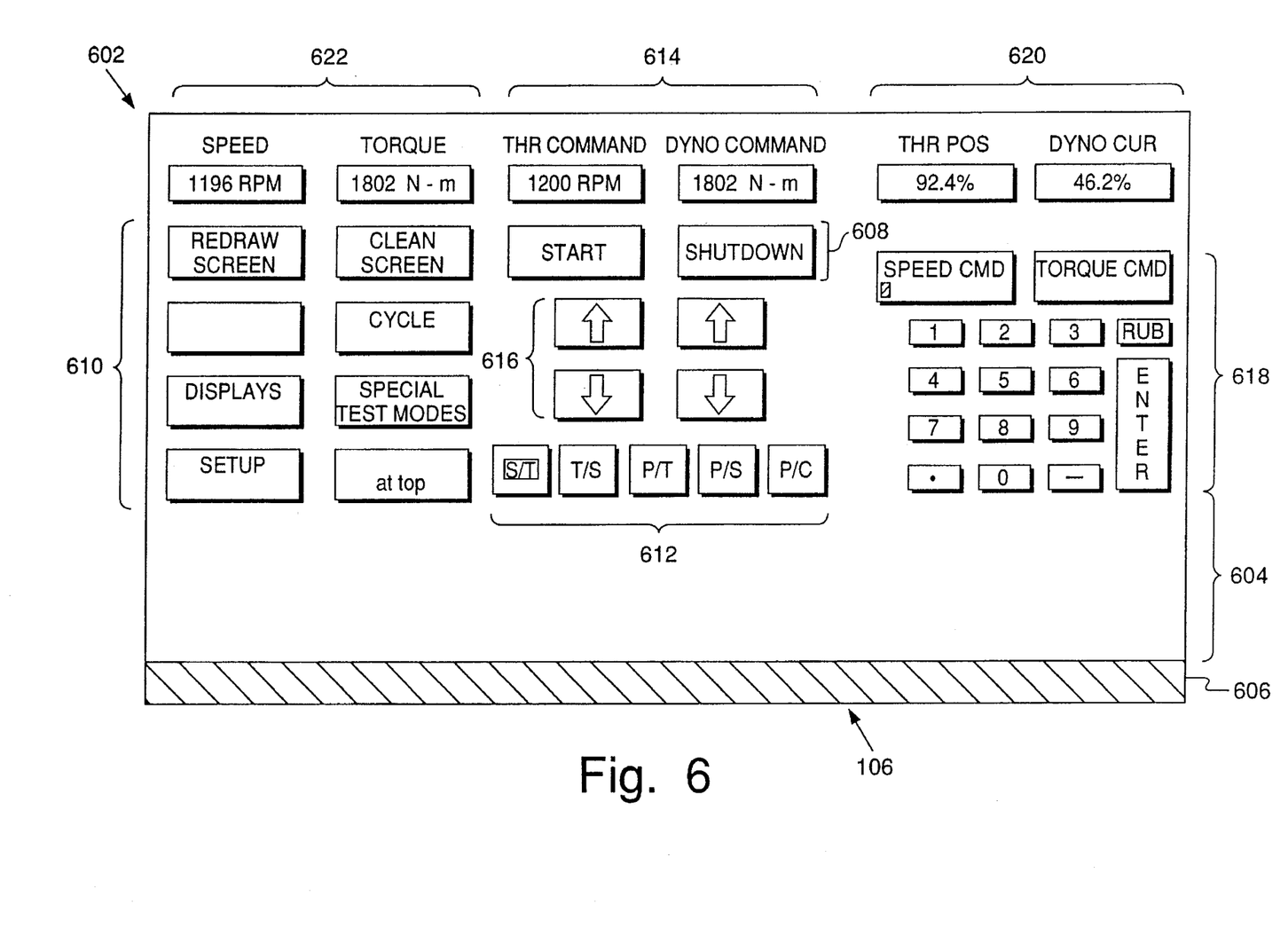
FIG. 6 is a representation of a "touch-control" screen of the operator interface having an upper segment, a lower segment, and an error message segment.

The touchscreen display 600 is programmably adaptable to visually display information regarding the state of the engine test apparatus 104 during the engine test cycle, display operator input keys, and accept information from the operator in response to physical contact with said operator input keys.

The touchscreen functions are set up to be as intuitive to the operator as possible. For example, to increase or decrease engine speed, the operator presses up and down arrows on the touch screen. Firmer pressures result in faster engine speed increase or decrease.

The touchscreen display 600 includes an upper segment 602 and a lower segment 604. The upper line segment 602 implements the basic functions of the system 102. The upper segment 602 is always displayed, no matter what else is being displayed in the lower segment 604. Manual operation of the engine through this screen is always active, unless an automatic cycle is running.

The integrated touch screen operator display 600 is programmably adapted to display an error message line 606. In the preferred embodiment, the bottom line of the display is reserved for error messages. Error messages are designed to be as descriptive as possible to make the user aware of an unacceptable condition. Enough information is given to clue the user in to some corrective action. Example messages are:

"Cannot start engine until safeties are reset."

"Cannot perform this function while cycle is running."

"Shutdown due to Low Oil Pressure."

"Engine start aborted due to timeout."

"Analog I/O Card not installed. Please call for service."

The integrated touch screen operator display 600 is programmably adapted to display an engine control portion 608. In the preferred embodiment, the engine display portion 608 includes an engine start button and a safety shutdown button.

If the engine start button is pressed an automatic engine start sequence is initiated. If the engine 202 has not started within a predetermined amount of time (typically 10 sec's), the start sequence is aborted. Once the engine 202 has started, this button changes to a "Low Idle" button, returning engine operating conditions to low idle when pressed.

If the safety shutdown button is pressed, the engine 202 is killed, the engine test apparatus 102 is shutdown, and the system 102 is returned to a default state of conditions. Once the safety shutdown has occurred, this button changes to a "Reset" button, which will reset the engine test apparatus 102 and enable the engine 202 to be started as long as all other safety parameters are within normal operating conditions.

The integrated touch screen operator display 600 is programmably adapted to display a function portion 610. In the preferred embodiment, the function portion 610 includes eight function keys at the left of the screen. The functions performed by the keys are programmable and allow the system 102 to be extremely flexible. A function key can either do a specific task, or can enable a sub-set of new Function Keys. The lower segment 604 is a display area which can change depending on the function key pressed (see below).

The integrated touch screen operator display 600 is programmably adapted to display a mode select portion 612. In the preferred embodiment, the mode select portion 612 includes a plurality of mode select buttons - one for each mode implemented by the test control means 108. The mode select buttons are located in the center of the screen. These five buttons select which of the four parameters (speed, torque, throttle position, dyno current) will be controlled by the throttle and dyno control loops, respectively. The details of each of the five control modes are discussed above and below.

The integrated touch screen operator display 600 is programmably adapted to display a setpoint display portion 614. In the preferred embodiment, the setpoint display portion 614 displays the control loop setpoints in engineering units at the top center of the screen. The units change depending on the active control mode.

The integrated touch screen operator display 600 is programmably adapted to display a setpoint modify portion 616. In the preferred embodiment, the setpoint modify portion 616 implements four setpoint entry arrows. The two setpoints can be modified by pressing one of the arrow buttons, located at the upper center of the screen. The two left buttons affect the throttle command setpoint, and the two right buttons affect the dynamometer command setpoint. The units of the setpoints depend on the active control mode. The arrows are "pressure sensitive", that is, a lighter touch will cause a slower change and a firmer touch will cause a faster change.

The integrated touch screen operator display 600 is programmably adapted to display a setpoint entry portion 618. In the preferred embodiment, the setpoint entry portion 618 implements a keypad which can also be used to modify the setpoints. Two entry display areas are provided immediately above the keypad. The left entry area affects the throttle command setpoint, and the right entry area affects the dynamometer command setpoint. The throttle command setpoint and the dynamometer command setpoint are selected for modification by touching one of the two display areas above the keypad. The labels on the two entry areas ("SPEED CMD", "TORQUE CMD", etc) are determined by the active control mode.

The integrated touch screen operator display 600 is programmably adapted to display a control output portion 620. The control output portion 620 displays the throttle position and dyno current output signals in percent full scale.

The integrated touch screen operator display 600 is programmably adapted to display a feedback display portion 622. The feedback display portion displays the engine speed and torque feedback measurements in engineering units.

In the preferred embodiment, the touchscreen display 602 is implemented by an Elographics Intellitouch touchscreen and a Multisynch VGA monitor. The touchscreen and monitor are purchased from Elographics of Oak Ridge, TN as a unit.

The Elographics touchscreen is based on surface acoustic wave (SAW) technology, which means that sound waves travel across the surface of the glass screen. When a soft object is placed on the screen, some of these sound waves are absorbed, and the touchscreen control circuitry senses that a touch has occurred. The touchscreen can only be activated by touching with a soft object, such as a fingertip or a pencil eraser. Hard objects, such as the tip of a pencil or an ink pen, will not activate touch.

The touchscreen can also sense touch "pressure". Actually, it decodes the surface area covered by, for example, a finger. The harder the finger is pressed, the more your finger flattens out. Therefore, the touchscreen will be more sensitive to the flat part of a thumb than to the tip of a smaller finger, and much less sensitive to a pencil eraser.

The system 102 uses the touchscreen's "pressure sensitivity" to give a unique but very natural feel to the setpoint entry arrows described above. The firmer the operator presses on one of the arrows, the faster the setpoint changes. This feature is also useful for scrolling screens across the bottom half of the display. By pressing harder, the information will scroll faster.

A touchscreen software driver following Elographics guidelines was written to enable the touchscreen to work with the test control means 108. The touchscreen driver is an interrupt-driven segment of code, which reads x, y, and z (pressure) information from the touchscreen hardware and reports touch activity to the higher level application software as needed. This allows the system 102 to implement many powerful and flexible features.

The software driver allows the system to detect a "TOUCH" and an "UNTOUCH". A touch is detected when a finger is placed on the screen. An untouch is detected when a finger is lifted from the screen. Reporting of untouch information can be enabled or disabled.

The software driver allows the system 102 to use POINT and STREAM Modes. In POINT mode only single touches or untouches are reported. In STREAM mode, touch information is reported continuously, as long as a finger is held down. The touchscreen driver can be toggled between POINT and STREAM modes.

The software driver also implements a ZONED Mode. In ZONED mode, button locations are predefined. When a touch is detected, the touchscreen driver only reports touches associated with one of these pre-defined buttons. The information reported is the number of the button touched instead of raw x and y coordinates. This can greatly simplify the application software.

The ZONED mode also allows "overlays" to be defined. Overlays are groups of buttons. Each overlay (group of buttons) is given a relative priority. Multiple overlays can occupy the same area of the screen, but only the buttons associated with the overlay with the highest priority will be processed. This can better be described by thinking of each overlay as a "window" which can be popped to the forefront of the screen. Even though other "windows" are present in the same screen area, only the active "window" is serviced. Overlays are defined with a relative location, so that they can be positioned anywhere on the screen. If a zoned group of buttons is not defined as an overlay, then they will be active all the time.

The system 102 uses the above features to provide a user interface which is both powerful and flexible and also easy to use.

The system 102 uses untouch information for activating the numeric keypad and the alpha-numeric keyboard. When a key is touched, it is highlighted. The operator can slide his finger around the keys, highlighting individual keys. The key is activated on untouch, when the user lifts his finger. This eliminates the problems of parallax errors and "fat-fingering" the small keys and activating the wrong one. If the user decides he does not want to activate any key, he can slide his finger out of the keypad or keyboard area and lift it off.

The system 102 uses POINT mode for most buttons, but uses STREAM mode for the setpoint entry arrows. When an arrow button is touched, the system 102 puts the touchscreen driver in STREAM mode. This allows continuous arrow operation, and modulation of the increase/decrease rate through touch pressure. When the finger is lifted (untouched) or slid out of the arrow button area, the touchscreen driver us placed back in POINT mode.

The system 102 uses ZONED mode exclusively. Button coordinates are defined in a "C" language structure by the programmer. When a button is pressed, the touchscreen driver reports the button number instead of the raw x and y coordinates (z information is reported in either case.) All button decoding is done by the touchscreen driver software instead of the system 102 application software. This allows much simpler programming, shown in the two examples below:

Button detection using Zoned mode:

```
if (button == FUNC_KEY0) (
    do_func0() ;
)
```

Button detection NOT using Zoned mode:

```
if (x >= 8 && x <= 29 && y >= 5 && y <= 9) (
    do_func0() ;
)
```

Each logical group of system buttons is defined as an overlay. For example, the cycle file listing screen is an overlay, and the alpha-numeric keyboard is an overlay (see below).

Figure 8:
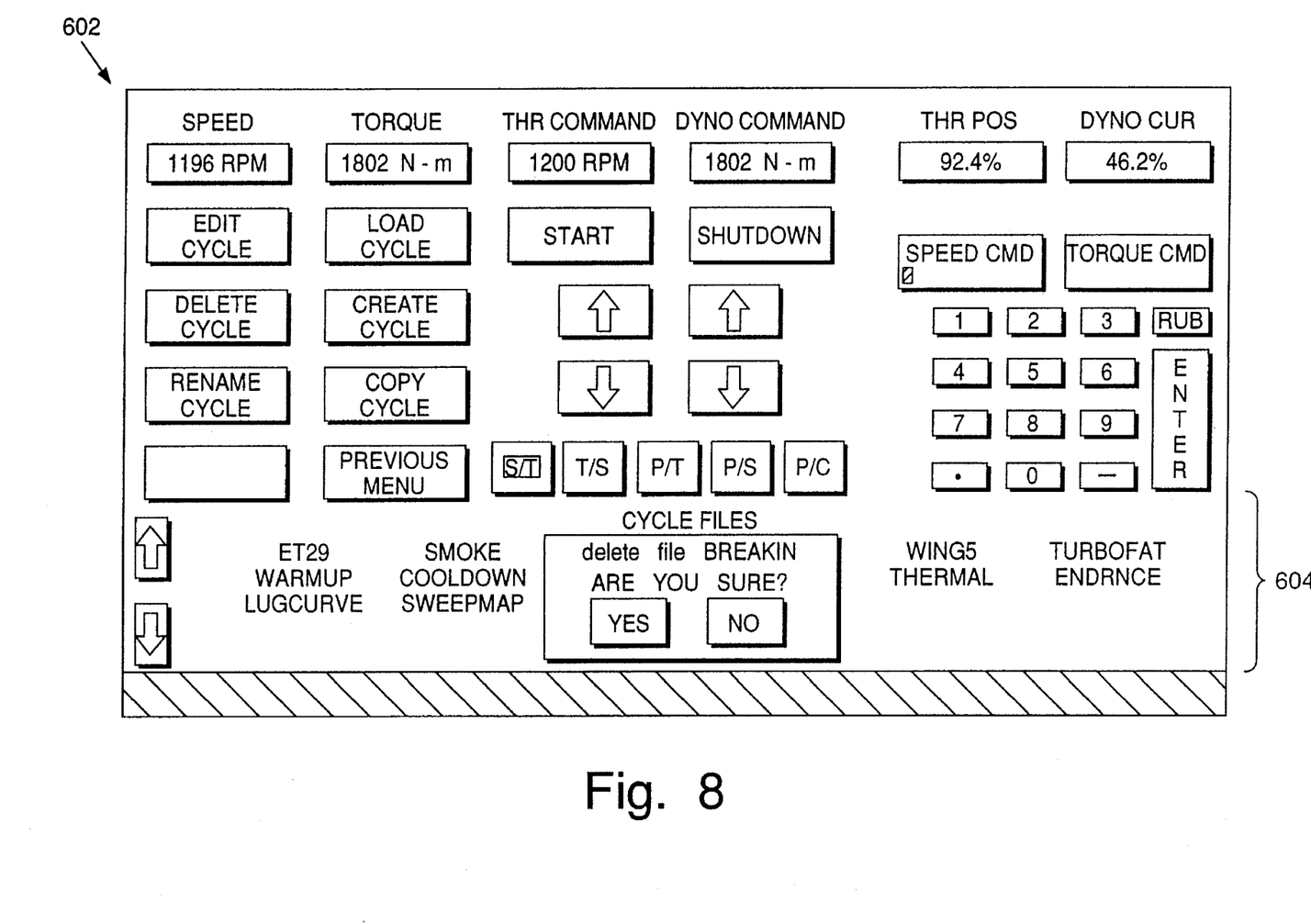
FIG. 8 is a representation of the touch-control screen of FIG. 6, illustrating a "delete file" confirmation query.
Figure 9:
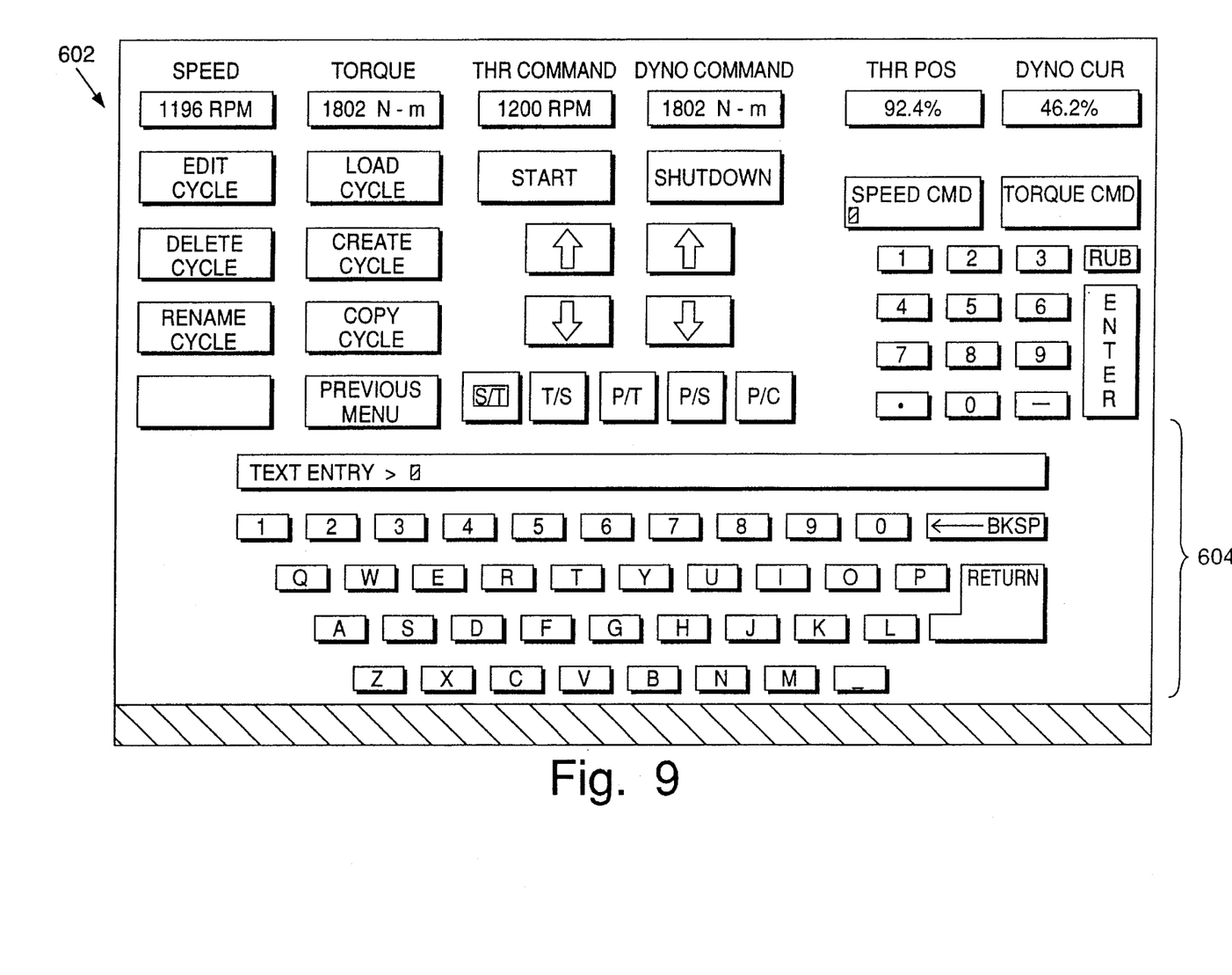
FIG. 9 is a representation of the touch-control screen of FIG. 6, illustrating a TEXT ENTRY keyboard in the lower segment.

Referring to FIG. 8, an example of how an overlay is used can be shown with the cycle files. From the cycle file listing screen, a file can be deleted by pressing the "DELETE CYCLE" function key. An "Are you sure" set of buttons is activated by this function key. Most of the cycle files are still visible, but cannot be activated because the "Are you sure" overlay has a higher priority. The system application software simply enables the "Are you sure" overlay when needed, and disables it when done. The main system screen in the upper segment 602 is not an overlay, and is therefore always enabled.

The upper segment 602 of the display 600 is always displayed and the touch is always enabled. This gives the operator manual control over the engine test apparatus 102 at all times. The lower segment 604 of the screen (except the error message line segment 606) is used for display or entry of the various related functions. These screens can be reached by traversing the hierarchy of the function keys.

Figure 7:
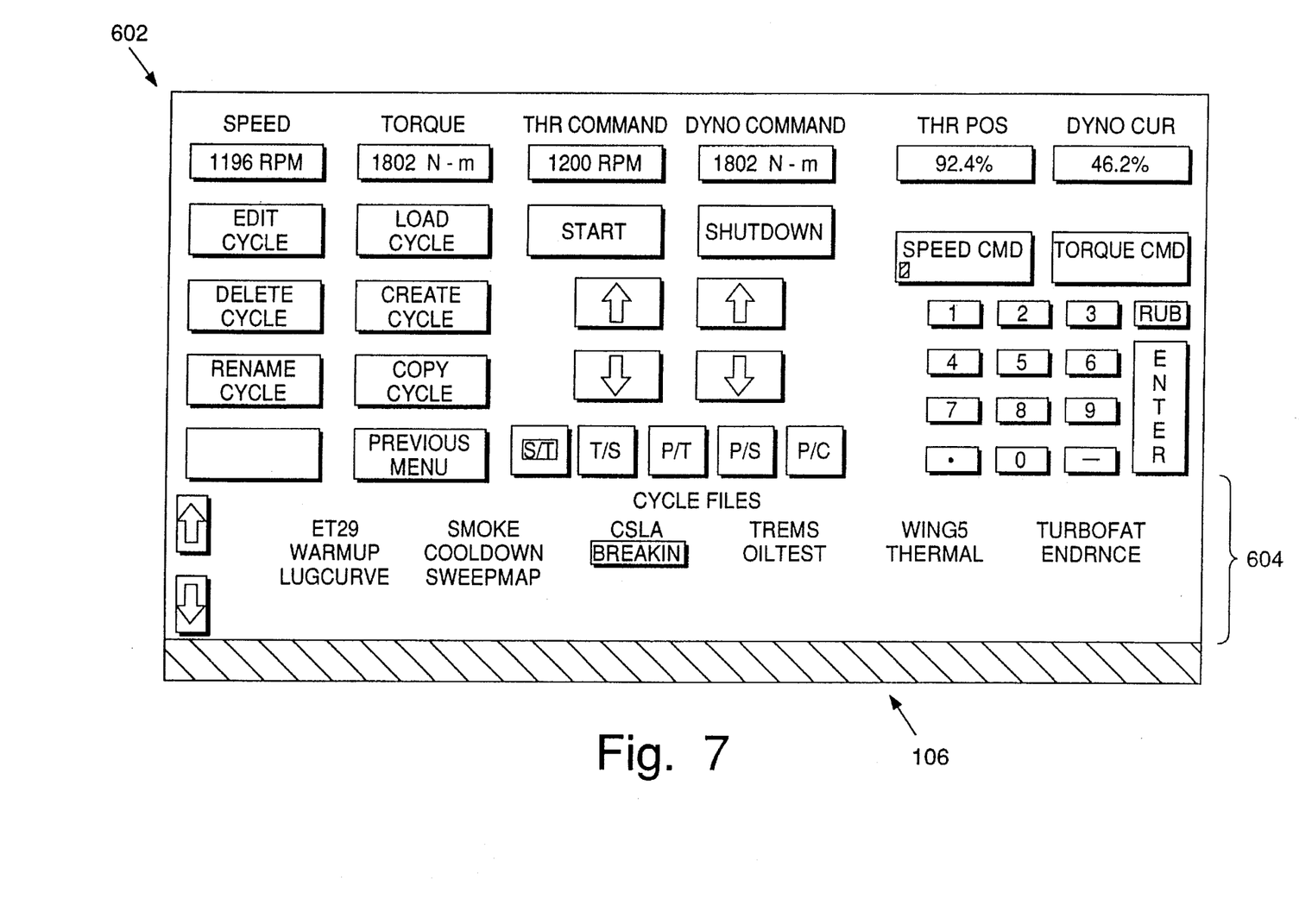
FIG. 7 is a representation of the touch-control screen of FIG. 6, illustrating a CYCLE FILE screen in the lower segment.

With reference to FIG. 7, by pressing the CYCLE function key the CYCLE FILES overlay is displayed in the lower segment 604. The function keys are also changed.

The CYCLE FILE overlay displays a listing of the cycle files currently stored in system memory. Files are selected by touching the file name. Up to forty-two file names can be displayed at one time (seven lines, six files across), but the number of files that can exist is only limited by the amount of memory available. If more than forty-two files exist, the screen can be scrolled up or down using the scroll arrow buttons on the left of the screen. File operations are done via the function keys. Supported operations are:

EDIT CYCLE: The cycle file editor is enabled in the lower half of the screen (see below).

LOAD CYCLE: The selected cycle is loaded as the current cycle to run.

DELETE CYCLE: The selected cycle is deleted. A query asking "Are you sure" pops up to help prevent mistakes (see FIG. 8).

CREATE CYCLE: The alpha-numeric keyboard pops up for entry of a new cycle file name (see FIG. 9). A blank cycle with the given name is created when the enter key is pressed. If no name has been entered, the operation is aborted. If a cycle with the given name already exists, the user is warned via a message on the error message line (bottom line) and the operation is aborted.

RENAME CYCLE: The alpha-numeric keyboard pops up for entry of a new cycle file name. The selected cycle file's name is changed when the enter key is pressed. Keyboard operation is the same as for "CREATE CYCLE".

COPY CYCLE: The alpha-numeric keyboard pops up for entry of a new cycle file name. The selected cycle file is copied to a file with the given name when the enter key is pressed. Keyboard operation is the same as for "CREATE CYCLE".

Figure 10:
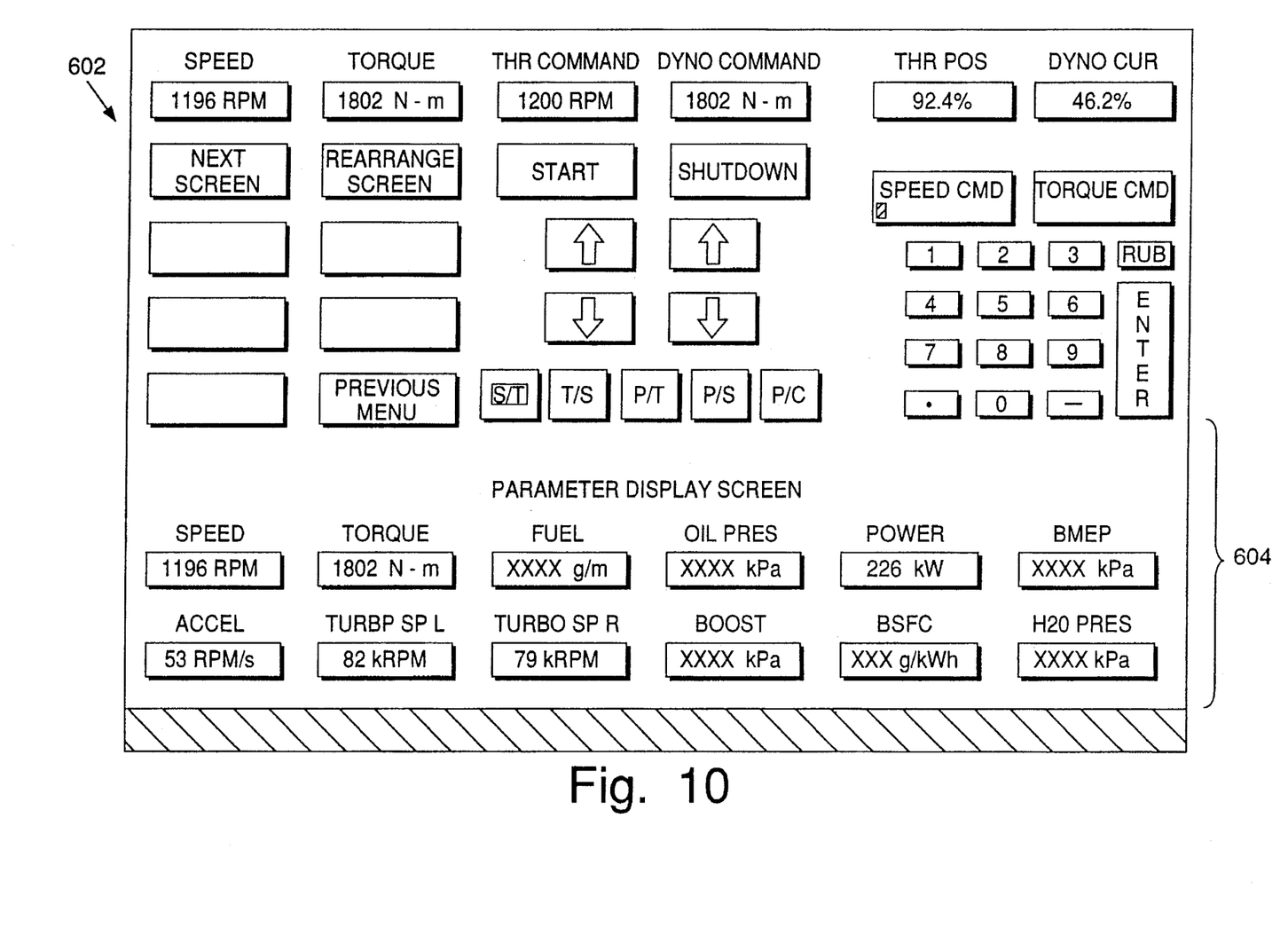
FIG. 10 is a representation of the touch-control screen of FIG. 6, illustrating a PARAMETER DISPLAY SCREEN in the lower segment.

By pressing the DISPLAYS function key from the Main Screen, a PARAMETER DISPLAY SCREEN overlay is shown in the lower segment 604 (see FIG. 10). The PARAMETER DISPLAY SCREEN a set of measured and calculated engine parameters. Additional parameters can be viewed by pressing the "NEXT SCREEN" function key. The displayed parameters can be re-arranged by pressing the "REARRANGE SCREEN" function key. Rearrangement is accomplished by touching the parameter you want to move. It then begins to flash and is ready to be moved. Touch the location you want to move it to, and the selected parameter will be swapped with the parameter in the new location. If there is currently no parameter in the new location, the selected parameter is just moved.

Figure 11:
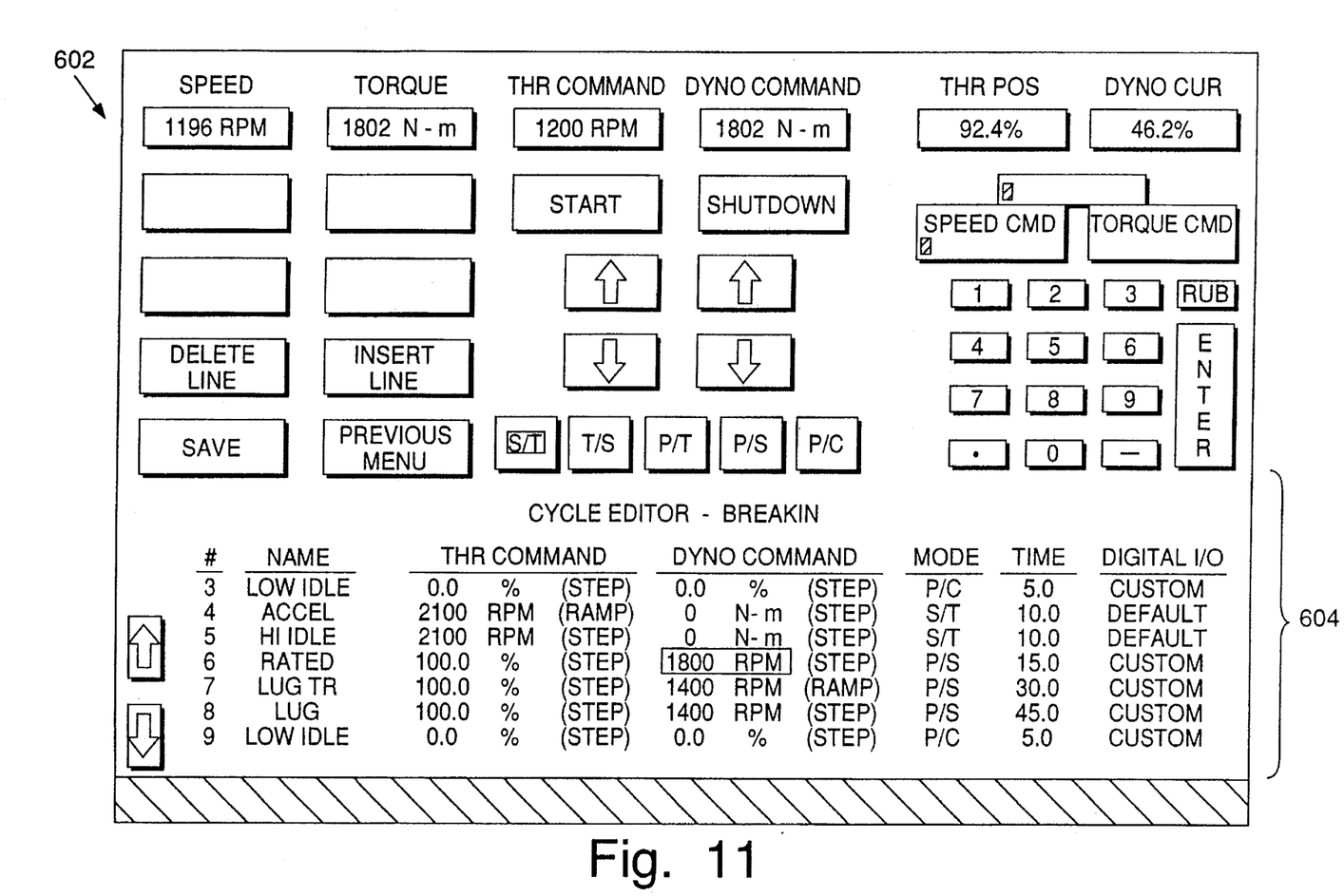
FIG. 11 is a representation of the touch-control screen of FIG. 6, illustrating a CYCLE EDITOR in the lower segment.

With reference to FIG. 11, cycle files are edited using a CYCLE EDITOR overlay. The CYCLE EDITOR overlay is activated by pressing the "EDIT CYCLE" function key from the CYCLE FILE overlay. The selected file is loaded into the cycle file editor.

A "cycle" is defined as a sequence of speed, torque settings, throttle positions, and/or dynamometer current. Each individual set of settings is called an "instruction". A cycle sequences through a number of instructions. Each line of the cycle editor represents one instruction in a cycle. Each instruction requires several pieces of information.

The cycle editor is set up similar to a spreadsheet. To select a field for editing, the operator touches that field and it is highlighted. Each instruction includes several fields.

The instruction number (#) is automatically generated and cannot be edited.

The NAME field is a descriptive name for the current instruction. To edit, press firmly on the name and the alpha-numeric keyboard will pop up on the screen. Use of the keyboard is the same as for filenames.

The THR COMMAND field is the setpoint for the throttle control loop. The units will change according to the control mode selected for this step. To edit, use the numeric keypad. A third entry area is activated for the keypad, directly above the normal two areas. Touch this entry area to place the cursor in it (see above). Enter the new setpoint value and it will show up in the highlighted field in the cycle editor. If the THR COMMAND field is left blank, the setpoint will remain the same as in the previous instruction. IF a mode change is implemented, the change in mode will be "bumpless" (see above).

The THR COMMAND STEP/RAMP field indicates the function at which the test control means 108 will control the throttle to reach the setpoint value. When the cycle is running, the throttle control setpoint for this step can be reached either immediately (STEP) or linearly over time (RAMP). To change, select the field by touching it and use the keypad ENTER key to toggle.

The DYNO COMMAND field is the setpoint for the dyno control loop. It operates similarly to the THR COMMAND field.

The DYNO COMMAND STEP/RAMP field works similarly for the dynamometer power supply 220.

The MODE field indicates the desired mode for the current instruction. To change, select the field by touching it. Use the keypad ENTER key to toggle through the five choices.

The TIME field indicates the duration in seconds of the current instruction of the cycle. To change, select the field by touching it, and enter the new value using the numeric keypad.

The DIGITAL I/O field allows individual safety inputs to be disabled during the current instruction, and allows individual relay outputs to be activated. Conditions are valid for this step only. To edit, press the field firmly and a pop up screen will appear.

Instructions can be deleted and inserted through use of the DELETE LINE and INSERT LINE function keys. A line is inserted with default conditions immediately above the presently selected line.

Although only seven steps can be viewed at a time, the length of a cycle is limited only by memory. To view additional steps, press the scroll arrows at the left of the screen. The editor will highlight the scroll bar if there are more steps off screen in that direction. If there are no more steps in that direction, the scroll bar will not be highlighted and will not activate.

It is important to note that changes made in the cycle editor are do not have an immediate impact on the present operating conditions of the engine test apparatus 102.

Industrial Applicability

With reference to the drawings and in operation, the present invention or system 102 is adapted to control an engine test apparatus 102.

The system 102 includes an operator interface means 106. The operator interface means 106 includes a touch screen display. The touch screen display provides visual feedback to the operator and allows the operator to input data, set up test cycles and control the engine test apparatus 102 during the test.

The operator interface means 106 is designed to provide a very easy to learn and intuitive means for performing the test operations. It allows tests to be set up and run quickly and provides a reduction in operator training time. Use of a touch screen display allows the system to be programmed without requiring operators to be a "programmer" because the tests are in a standard format and are easy to understand by all users.

The system 102 allows for "bumpless" and "on the fly" changes between a plurality of control modes. This allows changes between the modes without requiring that the engine test apparatus 102 be in a specific state prior to the change. It also allows the system 102 to be programmed with a set of predetermined instructions (cycle).

In the preferred embodiment, the system 102 provide for five control modes. Preferably, the engine test apparatus 102 includes an engine 202 and a dynamometer 204 and a control loop associated with each. The control mode defines which engine/dynamometer parameter each of the two control loops will be controlling.

The system 102 implements two active closed-loop controls, one controlling the throttle position, and one controlling the dynamometer (or dyno) current (see above).

The five control modes implement the most widely used control loop conditions.

In the first or "speed/torque" or "S/T" mode, the throttle control loop is used to control engine speed and the dynamometer control loop is used to control engine torque. The throttle position is automatically adjusted to achieve the desired speed, and the dyno current is automatically adjusted to achieve the desired torque. The S/T mode is useful for obtaining various part load operating points. It is probably the most commonly used of the 5 control modes.

In the second or "torque/speed" or "T/S" mode, the throttle control loop is used to control engine output torque and the dynamometer control loop is used to control engine speed. The throttle position is automatically adjusted to achieve the desired torque, and the dynamometer current is automatically adjusted to achieve the desired speed. The T/S mode is typically used in transient emission test cells for running EPA Transient Emission Cycles.

In the third or "position/torque" or "P/T" mode, the throttle control loop is used to control throttle position and the dynamometer control loop is used to control engine torque. The throttle is set to the desired position, and the dynamometer current is automatically adjusted to achieve the desired torque. The P/T mode is useful when a specific torque operation point is desired, but a constant engine speed is not important. It is also useful for measuring governor droop.

In the fourth or "position/speed" or "P/S" mode, the throttle control loop is used to control throttle position and the dynamometer control loop is used to control engine speed. The throttle is set for the desired position, and the dyno current is automatically adjusted to achieve the desired speed. The P/S mode is useful for operating along the lug curve of the engine. A typical use of this mode would be for determining engine rated conditions, for example.

In the fifth or "position/current" or "P/C" the throttle control loop is used to control throttle position and the dynamometer control loop is used to control dynamometer current. The throttle is set to the desired position, and the dynamometer power supply is set to the desired current. The P/C mode is useful for achieving low idle and high idle conditions, and is also used while starting the engine or shutting it down.

As discussed above, the system 102 can change from one control mode to another at any time, and under any operating conditions. This is known as "bumpless" mode change, meaning that the engine conditions will not "bump", or change. When a mode change occurs, the feedback for the each loop is changed to the new parameter to be controlled. At the same time, the setpoint for the loop is changed to the present operating condition for that parameter. For example, consider changing to S/T mode. The throttle loop feedback is changed to speed, and at the same time, the throttle setpoint is changed to equal the present speed. This provides the condition that setpoint is equal to feedback, and therefore no change to throttle position occurs.

Other aspects, objects, and advantages of the present invention can be obtained from a study of the drawings, the disclosure and the appended claims.

We claim:

1. A system for controlling the operation of an engine test apparatus during a test cycle, the engine test apparatus including an engine and a throttle actuator for responsively controlling fuel flow to the engine, wherein the system controllably actuates the throttle actuator using a desired one of throttle position, torque and engine speed feedback modes, comprising:

operator interface means for producing a control mode signal indicative of the desired feedback mode and a setpoint corresponding to the desired one of throttle position, torque and engine speed feedback modes;

feedback select means for receiving said control mode signal, responsively sensing an operating characteristic of the engine test apparatus corresponding to the desired feedback mode and responsively producing a respective operating characteristic signal; and test control means for receiving said control mode signal, said setpoint, and said respective operating characteristic signal and responsively operating the engine test apparatus, and wherein said test control means operates the throttle actuator using closed loop control based on the setpoint and the sensed operating characteristic;

wherein said test control means includes a lead-lag amplifier for providing lead-lag compensation for dynamic aspects of the engine's response in response to torque or engine speed feedback being desired said lead-lag compensation having a transfer function of:

$$k \cdot (s+a)^2/(s+b)^2,$$

where k, a and b are constants.

2. A system, as set forth in claim 1, wherein the engine test apparatus further includes a dynamometer and a dynamometer power supply to controllably provide electric current to said dynamometer in response to a current command from said test control means.

3. A system, as set forth in claim 2, wherein the system controllably actuates the dynamometer power supply using a desired one of the torque, engine speed, and dynamometer power supply current feedback modes.

4. A system, as set forth in claim 3, said control mode signal having one of a first, second or third value, wherein said first value being indicative of controlling the throttle actuator using engine speed feedback and controlling the dynamometer power supply using torque feedback being desired, said second value being indicative of controlling the throttle actuator using torque feedback and controlling the dynamometer power supply using engine speed feedback being desired, and said third value being indicating of controlling the throttle actuator using throttle position feedback.

5. A system for controlling the operation of an engine test apparatus during a test cycle, the engine test apparatus including an engine, a throttle actuator for responsively controlling fuel flow to the engine, a dynamometer and, a dynamometer power supply adapted to controllably provide electric current to the dynamometer in response to a current command, wherein the system controllably actuates the throttle actuator using a desired one of throttle position, torque and engine speed feedback modes and controllably actuates the dynamometer power supply using a desired one of torque, engine speed, and dynamometer power supply current feedback modes, comprising:

operator interface means for producing a control mode signal having one of a first, second, third, fourth, fifth values said first value being indicative of engine speed and torque feedback modes being desired for the throttle actuator and the dynamometer power supply, respectively, said second value being indicative of torque and engine speed feedback modes being desired for the throttle actuator and the dynamometer power supply, respectively, said third value being indicative of throttle position and torque feedback modes being desired for the throttle actuator and the dynamometer power supply, respectively, said fourth value being indicative of throttle position and engine speed feedback modes being desired for the throttle actuator and the dynamometer power supply, respectively, and said fifth value being indicative of throttle position and dynamometer power supply current feedback modes being desired for the throttle actuator and the dynamometer power supply, respectively, said operator interface means being adapted for producing setpoints corresponding to said desired feedback modes;

feedback select means for receiving said control mode signal, responsively sensing operating characteristics of the engine test apparatus corresponding to the desired feedback modes and responsively producing a respective operating characteristic signals; and test control means for receiving said control mode signal, said setpoints, and said respective operating characteristic signals and responsively operating the engine test apparatus, wherein said test control means operates the throttle actuator using closed loop control based on the respective setpoint and the dynamometer power supply using closed loop control based on the respective setpoint, and wherein said test control means includes a lead-lag amplifier in the throttle actuator closed loop control to compensate for dynamic aspects of the engine's response in response to torque or engine speed feedback being desired said lead-lag compensation having a transfer function of:

$$k \cdot (s+a)^2/(s+b)^2,$$

where k, a and b are constants.

6. A method for controlling the operation of an engine test apparatus during a test cycle, the engine test apparatus including an engine and a throttle actuator for responsively control fuel flow to the engine, the system being adapted to controllable actuate the throttle actuator using a desired one of throttle position, torque, and engine speed feedback modes, comprising:

producing a control mode signal indicative of a desired feedback mode and a respective setpoint;

receiving said control mode signal, responsively sensing an operating characteristic of the engine test apparatus corresponding to the desired feedback mode and responsively producing a respective operating characteristic signal;

receiving said control mode signal, said respective operating characteristic signal, and said setpoint and responsively operating the throttle actuator using closed loop control based on the setpoint; and compensating for dynamic aspects of the engine's response using lead-lag phase compensation in response to the desired one of throttle position, torque, and engine speed feedback modes being one of torque and engine speed feedback modes, said lead-lag compensation having a transfer function of:

$$k \cdot (s+a)^2/(s+b)^2,$$

where k, a and b are constants.

* * * * *